N. TESLA.
FREQUENCY METER.
APPLICATION FILED DEC. 18, 1916.
1,402,025. Patented Jan. 3, 1922.
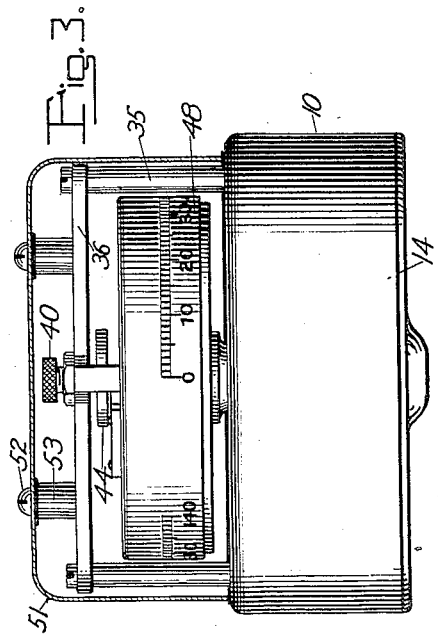
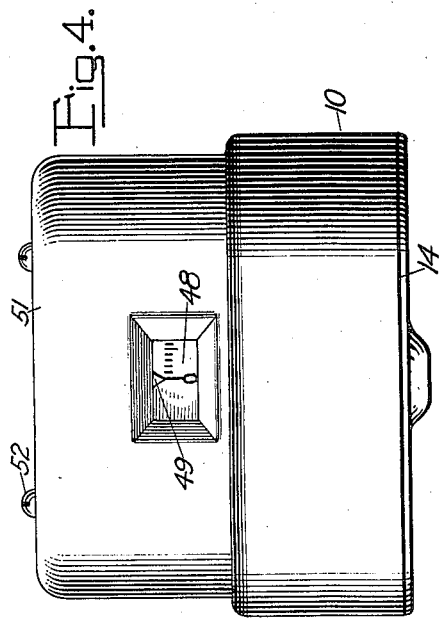
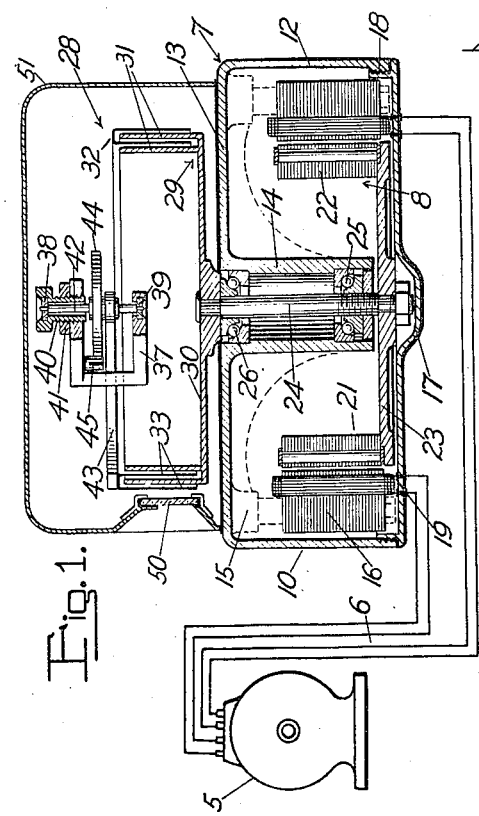
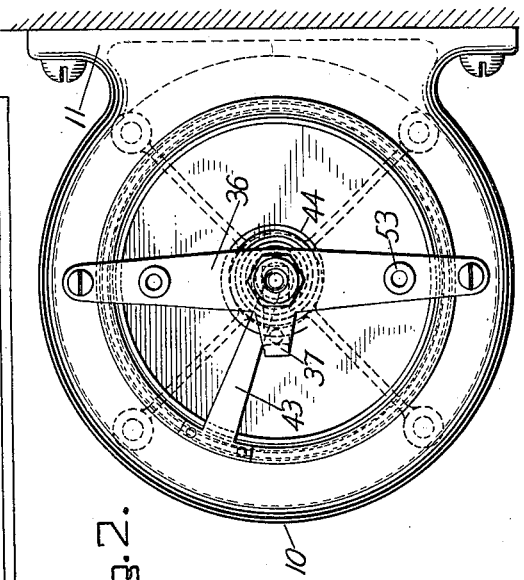
Inventor
Nikola Tesla
By his Attorneys
Forée Bain & May

UNITED STATES PATENT OFFICE.

NIKOLA TESLA, OF NEW YORK, N. Y., ASSIGNOR TO WALTHAM WATCH COMPANY, OF WALTHAM, MASSACHUSETTS, A CORPORATION OF MASSACHUSETTS.

FREQUENCY METER.

1,402,025. Specification of Letters Patent. Patented Jan. 3, 1922.

Application filed December 18, 1916. Serial No. 137,689.

*To all whom it may concern:*

Be it known that I, NIKOLA TESLA, a citizen of the United States, residing at New York, in the county and State of New York, have invented certain new and useful Improvements in Frequency Meters, of which the following is a full, clear, and exact description.

In many instances in practice it is very desirable and important to ascertain the frequency of periodic currents or electric oscillations and therefrom the speed of rotation or reciprocation of the generating or controlling apparatus.

The devices commonly used at present for this purpose and designated "frequency meters" generally consist of reeds or bars tuned to respond to impulses of definite periods, or a direct current dynamo coupled to the alternating generator or frequency controller and connected with an instrument, of voltmeter construction, graduated to indicate the instantaneous frequency of the current. Both of these forms are objectionable from many points of view, being subject to various limitations of practical availability and to disturbing influences, all so well known to experts as to dispense with the necessity of enlarging upon them on this occasion.

My invention has for its object to provide a frequency meter of great accuracy, structural simplicity, wide range of use, and low cost, all adequate to meet the pressing demand for a commercial and scientifically satisfactory instrument of improved form.

In the drawings, wherein I have illustrated a single embodiment of my invention for purposes of disclosure,—

Fig. 1 is a central vertical section through the frequency meter, with diagrammatic extension to indicate an available manner of connecting it to a two-phase generator;

Fig. 2 is an end view;

Fig. 3 is a side elevation with the cover in section, and Fig. 4 is a side elevation of the instrument from its reading side.

It will be understood that the specific construction of instruments embodying my invention may be modified in many ways according to the demands of the electrical or mechanical environment in which it is to be used, and while I shall describe in detail a specific construction, illustrated in the drawing, it is without intent to limit my invention in its broader aspects to matters of detail.

5 represents diagrammatically a two-phase generator, typifying the machine controlling the frequency to be measured, and having suitable connection by wires 6 with the synchronous-motor element of the frequency meter, indicated as a whole by 7. The motor, 8, will of course have field poles and armature bars appropriate to the character of the current supplied from the generator 5, the motor being of the split-phase, two-phase, or other type, as needed. A frame 10, having lugs 11, or other means of support, provides a cup-formed shell 12 with a top wall 13 furnished with a central bearing tube 14 and with suitable supporting means, as 15, for the stationary field structure 16. A cap 17, screw threaded at 18, and suitably packed, hermetically seals one side of the motor casing into which the connecting wires are led through any suitable sealing and insulating bushings 19.

For accuracy and promptness of response to frequency-variations, the armature structure 21, as a whole, with its attachments should be of very light weight and so equipped that its work is minimized. Hence it is important both that the construction of the armature element be designed with reference to smallness and consequent lightness of parts, and that its frequency-indicating equipment be of a character imposing the lightest load on the armature. Specifically, the armature laminæ 22 are carried on a light disk 23, fixed to the vertical shaft 24, that is supported by ball bearings 25 and 26, in tube 14, and, above the wall 13, carries the driving member of the indicator device 28. This appliance comprises, as its primary element, 29, a non-magnetic disk 30, of brass, say, having annular spaced, concentric walls 31, and as its secondary element, 32, a pivoted part including very light, annular walls 33 interleaved with the walls 31 and affording extensive smooth friction surfaces, very closely adjacent to, but not contacting with, the kindred surfaces of the primary member so that through the thin films of fluid, preferably air, intervening between them, torque may be transmitted from the primary to the secondary element in substantially linear proportion to the speed of the primary. Posts 35, mounted in the top wall of the frame, support a bridge piece 36 that carries a bearing yoke 37, affording upper and lower jewel bearings 38 and 39, the former contained in a bushing 40 threaded for adjustment in the yoke and set by a nut 41, such bearings receiving the spindle 42 from which extends, rigidly, the arm 43 carrying the annular walls of the secondary element. A spiral spring 44, fixed at one end to the shaft 42 and at its other end clamped adjustably in the split stud 45 on bracket 37, permits rotary displacement of the secondary element, substantially in linear proportion to the force applied. A scale 48, printed on or otherwise affixed to the outermost wall of the secondary element, is graduated in units of frequency and its indication point is determined by a fixed pointer 49 that is fixed at the edge of a transparent sealed window 50 of the casing shell 51 of cup formation, that is secured in sealed relation to the wall 13 as by packed screws 52 engaging bosses 53 on the bridge piece 36 so to complete the hermetic enclosure of the chamber containing the indicating elements. Such hermetic closure is not necessary in many instances but may be desirable.

In my copending application Serial No. 841,726 filed May 29th, 1914, Patent No. 1,209,359 I have set forth in detail certain laws the observance of which results in attainment of rigorous proportionality of deflections to speed in an "air drag" instrument, and all of such conditions may be observed to advantage in constructing the indication-giving element of the frequency meter.

It will be noted that an instrument as herein described has many structural and operative advantages. The translating instrument, giving the frequency-reading, when constructed for use of air as the transmitting medium, may be of size to give ample torque, but if desired the ensealed mechanism may be operated in air or other, preferably inert, gases of more than atmospheric density for increase of the torque. The air drag instrument is substantially unaffected in accuracy by temperature changes, without special compensating mechanism, and is therefore practically insensible to the heating effect of the subjacent motor, and the double-chamber construction segregating the motor and translating device prevents the latter from being affected by air-currents engendered by the motor-operation. Furthermore, the indicator structure may be made immune to magnetic influence and eddy currents, however intense, by making its secondary element of appropriate non-shrinkable, insulating material, as compressed fiber, although in many instances the partition 13, acting as a shield for the indicator obviates the necessity for such provision. The small size, low cost and ease of maintenance, due to the simplicity of the construction are especially desirable.

What I claim is:

1. In a frequency meter, the combination of a synchronous motor, and a speed-responsive device, having a primary element connected to the armature shaft, and a pivoted torsionally-restrained secondary element, deflectable in substantially linear proportion to the speed of the primary and calibrated in terms of electrical frequency.

2. In a frequency meter, the combination of a synchronous motor and a speed-responsive device, said motor having an armature of light construction and said speed-responsive device comprising a primary element carried in rotation by said armature, and a torsionally-restrained secondary element, these elements having extensive confronting, closely adjacent friction surfaces, cooperating through interposed films of a fluid medium for displacement of said secondary element in substantially linear proportion to the speed of rotation of the primary element.

3. In a frequency meter, the combination of a synchronous motor and a speed-responsive device, the former having an armature of light construction and the latter comprising a primary element, carried in rotation by said armature, and a torsionally-restrained secondary element, these elements having extensive confronting, closely adjacent friction surfaces, cooperating through interposed films of air for displacement of said secondary element in substantially linear proportion to the speed of rotation of the primary element, said secondary bearing a scale calibrated in terms of frequency.

4. A frequency meter comprising, in combination, a synchronous induction motor, having a shell carrying the field, and a rotatable armature within the chamber of said shell having its shaft extended through said shell; and a speed-responsive device, comprising a closed casing, a non-magnetic primary element mounted upon said armature shaft, a separately mounted secondary element pivoted and torsionally restrained, said elements having opposed, closely adjacent non-contacting surfaces, co-operating through interposed films of a fluid medium through which torque is transmitted to the secondary in approximately linear proportion to the speed of the primary member, and a visible scale uniformly graduated in terms of frequency carried by the secondary member.

5. A frequency meter comprising a sealed, air-containing casing divided into two compartments, a shaft extending into both compartments, a synchronous motor in one compartment adapted to drive said shaft and an indicating device in the other, said device having a primary rotatable element connected with the shaft, a separately mounted, indication-controlling element and a spring restraining the latter, said elements having extensive, confronting, closely adjacent, non-contacting surfaces cooperating through the interposed air films for displacement of the secondary, at all ordinary temperatures, approximately in linear proportion to the speed of the primary element.

6. In a frequency meter, the combination of a synchronous motor having an armature of light construction, a speed-responsive device comprising a primary element carried in rotation by the said armature and a torsionally-restrained secondary element, said elements having extensive confronting closely adjacent friction surfaces cooperating through interposed films of air for displacement of said secondary element in substantially linear proportion to the speed of rotation of the primary element, and a wall interposed between the armature of the motor and the speed-responsive device for shielding the latter from air disturbance caused by rotation of the former.

7. A frequency meter comprising a casing divided into two compartments, a shaft extending into both thereof, a synchronous motor in one compartment adapted to drive said shaft and a speed-responsive device in the other having a primary element connected for rotation with said shaft, a separately mounted, torsionally-restrained indicating element, said elements having extensive confronting, closely adjacent, non-contacting surfaces cooperating through interposed gaseous films for displacement of the secondary, approximately in linear proportion to the speed of the primary element.

8. In a frequency meter, the combination of a synchronous motor and a speed-responsive device, said motor having a light armature and a shaft, and said speed responsive device comprising a primary element of non-magnetic material carried by the armature shaft and a torsionally-restrained secondary element, these elements having extensive, confronting, closely adjacent, non-contacting surfaces cooperating through interposed films of a fluid medium for displacement of the secondary element in approximately linear proportion to the speed of the primary element, and a containing structure ensealing the speed responsive device.

9. In a frequency meter, the combination of a synchronous motor having an armature of light construction, a speed-responsive device comprising a primary element carried in rotation by the said armature and a torsionally-restrained secondary element, said elements having extensive confronting, closely adjacent friction surfaces cooperating through interposed films of air for displacement of said secondary element in substantially linear proportion to the speed of rotation of the primary element, and means interposed between the armature of the motor and the speed-responsive device for shielding the latter from air disturbance caused by rotation of the former.

In testimony whereof I affix my signature.

NIKOLA TESLA.